United States Patent [19]

Bricheno et al.

[11] 4,404,010
[45] Sep. 13, 1983

[54] REPLACING OPTICAL FIBRE SHEATHING AFTER FUSION SPLICING

[75] Inventors: Terry Bricheno, Near Bishop's Stortford; Alexander J. Robertson, Hoddesdon; Ross K. Finlay, Harlow, all of England

[73] Assignee: International Standard Electric Corporation, New York, N.Y.

[21] Appl. No.: 317,704

[22] Filed: Nov. 2, 1981

[30] Foreign Application Priority Data

Nov. 14, 1980 [GB] United Kingdom ............... 8036717

[51] Int. Cl.$^3$ .................... G02B 5/14; B29D 11/00
[52] U.S. Cl. ........................ 65/4.2; 65/36; 264/1.5; 264/230; 350/96.21
[58] Field of Search ............ 264/1.5, 230, DIG. 71; 174/DIG. 8, DIG. 12; 350/96.21, 96.20; 65/4.2, 36

[56] References Cited

U.S. PATENT DOCUMENTS

| | | | |
|---|---|---|---|
| 3,033,727 | 5/1962 | Cram et al. | 174/DIG. 8 |
| 3,159,513 | 12/1964 | Baier | 174/DIG. 8 |
| 3,455,625 | 7/1969 | Brumley et al. | 350/596.22 |
| 3,669,824 | 6/1972 | Hess | 264/230 |
| 3,810,802 | 5/1974 | Buhite et al. | 156/158 |
| 3,861,781 | 1/1975 | Hasegawa et al. | 350/596.21 |
| 3,944,328 | 3/1976 | Kent et al. | 350/96.21 |
| 4,078,910 | 3/1978 | Dalgoutte | 65/3.2 |
| 4,087,157 | 5/1978 | Hodges | 350/96.21 |
| 4,178,067 | 12/1979 | Johnson et al. | 350/96.21 |
| 4,179,186 | 12/1979 | Tynes | 350/96.21 |
| 4,196,032 | 4/1980 | Eggleston | 264/1.5 |
| 4,220,619 | 9/1980 | Kersten | 264/230 |
| 4,261,644 | 4/1981 | Giannaris | 350/96.21 |
| 4,287,012 | 9/1981 | Midgley et al. | 174/DIG. 8 |
| 4,289,721 | 9/1981 | Ishise | 264/230 |
| 4,290,668 | 9/1981 | Ellis et al. | 350/96.21 |

FOREIGN PATENT DOCUMENTS

| | | | |
|---|---|---|---|
| 2510618 | 9/1975 | Fed. Rep. of Germany | 350/96.20 |
| 2845887 | 4/1980 | Fed. Rep. of Germany | 264/1.5 |
| 54-107745 | 8/1979 | Japan | 350/96.21 |
| 54-151455 | 11/1979 | Japan | 350/96.21 |
| 55-69113 | 5/1980 | Japan | 350/96.21 |

OTHER PUBLICATIONS

"Optical Fiber Splicing Technique with a $CO_2$ Lazer", Fujita et al., *Applied Optics*, vol. 15, No. 2, Feb. 1976, pp. 320–321.

"Field Installable Optical Fiber Connector", Uberbacher IBM Technical Disclosure Bulletin, vol. 25, No. 1, Jun. 1982, p. 402.

*Primary Examiner*—James B. Lowe
*Attorney, Agent, or Firm*—John T. O'Halloran

[57] ABSTRACT

When a pair of plastics sheathed glass optical fibres (1, 2) is joined by a fusion splice there is a length of bare fibre between where the original sheathing of one fibre terminates and where that of the other begins. This gap is filled with reinstatement sheathing (5, 5b) which is fused to the original sheathing using a length (4) of heat-shrink tubing as a mould. The heat-shrink tubing is then removed to leave a smooth profile for the spliced fibre.

9 Claims, 11 Drawing Figures

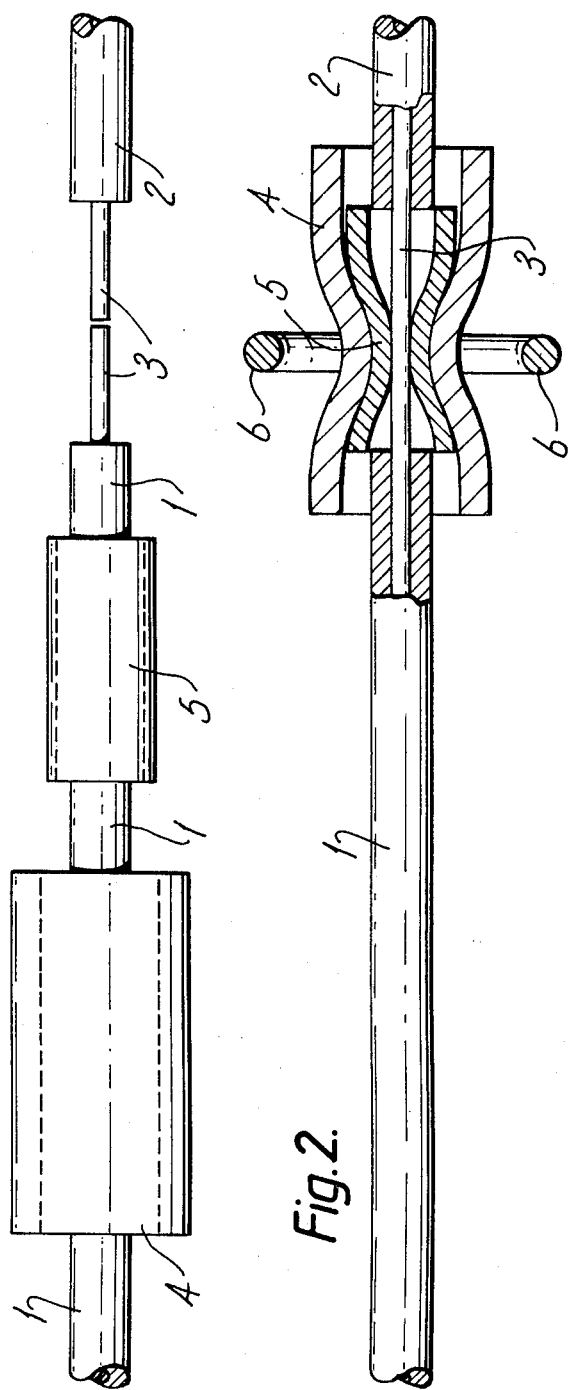
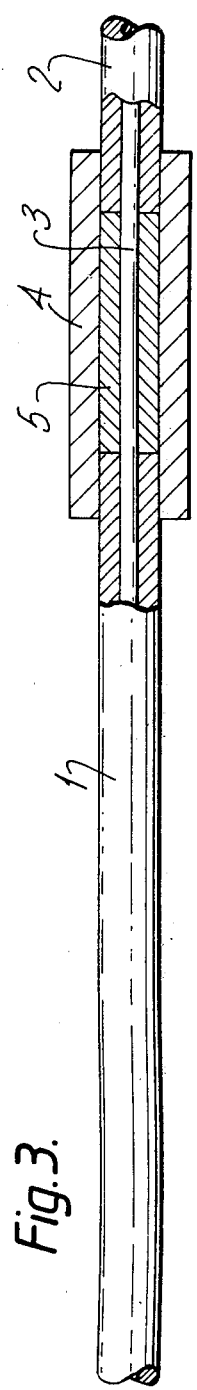

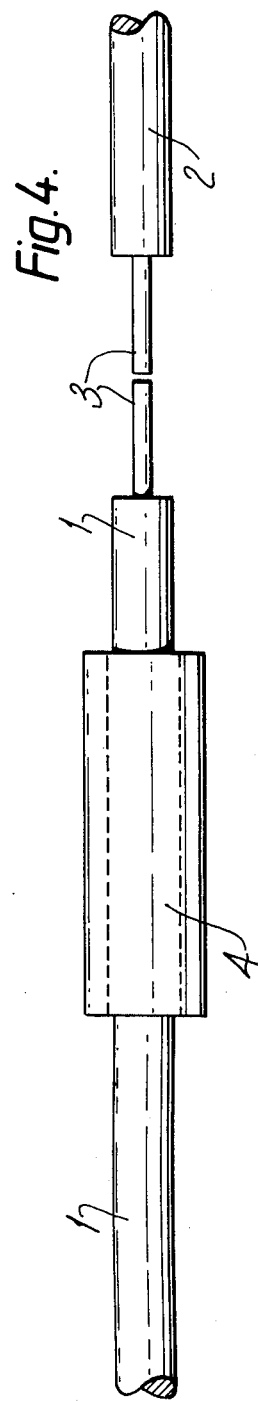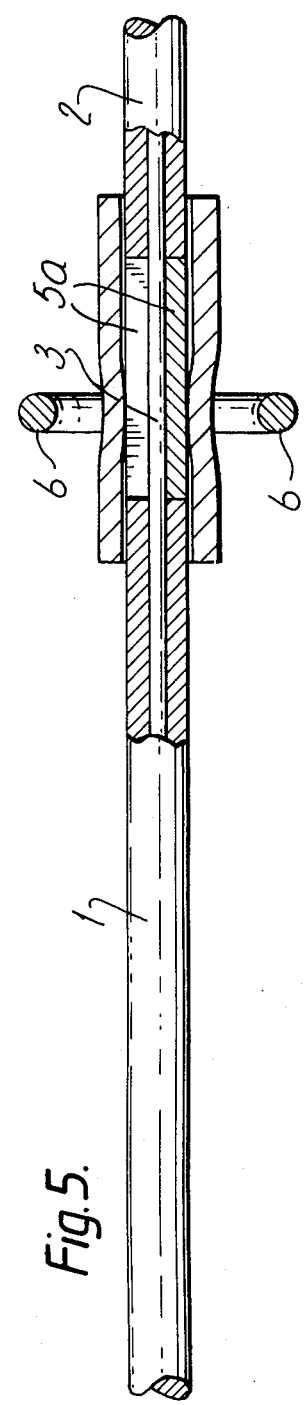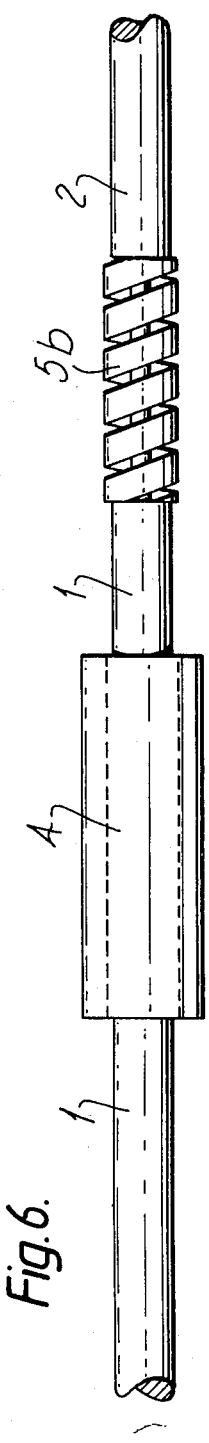

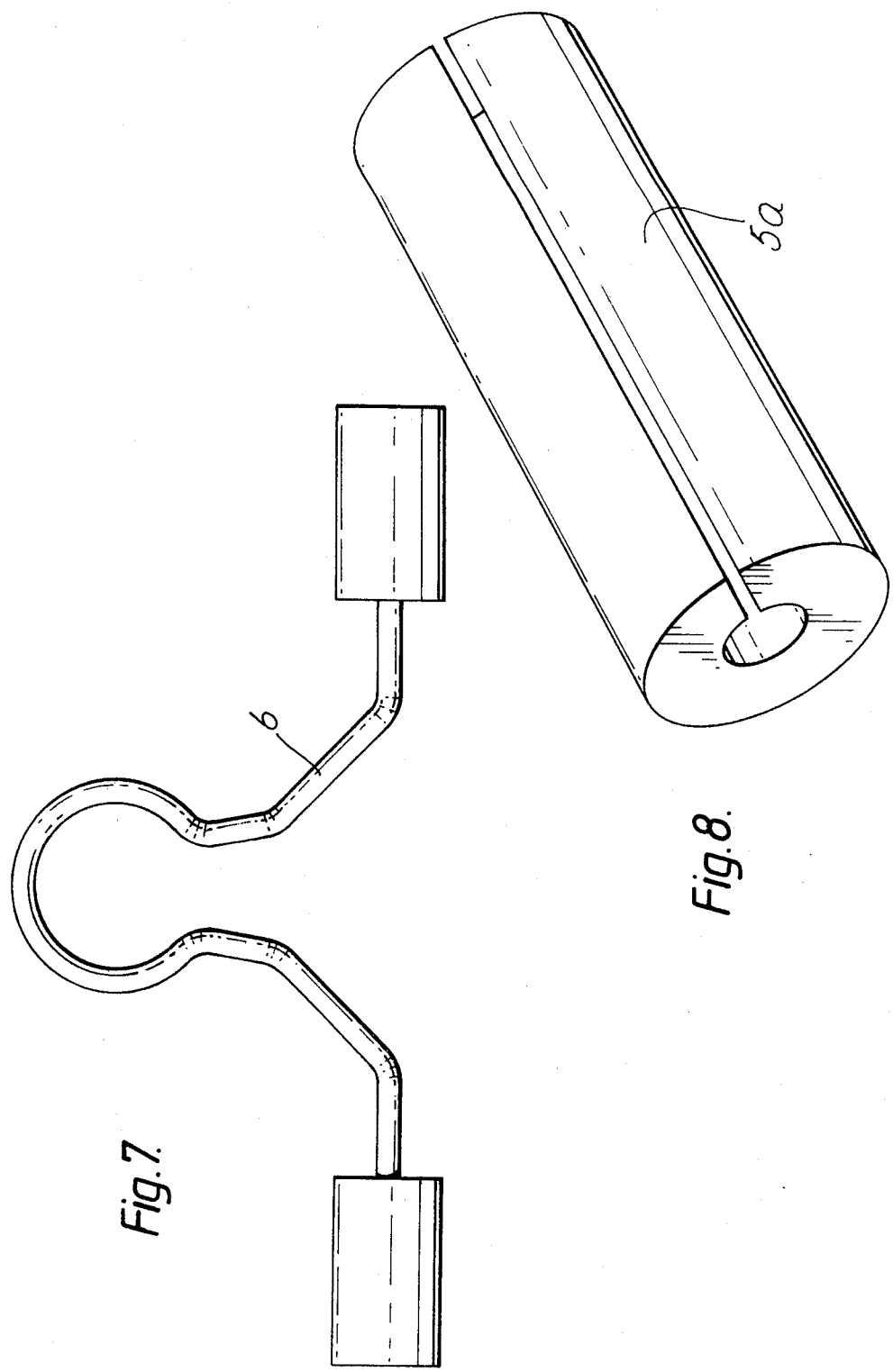

REPLACING OPTICAL FIBRE SHEATHING AFTER FUSION SPLICING

This invention relates to the reinstatement of plastics sheathing over a fusion splice made between the ends of a pair of plastics sheathed glass optical fibres.

Much attention has been given to ways of forming a permanent optical coupling between the ends of a pair of optical fibres. One particular way of forming such splices in glass optical fibres that has been found satisfactory is the technique known as fusion splicing. The basic principle of fusion splicing is described for instance in the Western Electric Company French patent specification No. 2 126 403. A useful characteristic of a fusion splice is that there is no inherent need for there to be any appreciable dilation of the fibre package contour in the region of the splice. In the case of a plastics sheathed glass optical fibre the plastics sheathing can be stripped from each end to expose a short distance of bare fibre. The two ends are then fused together leaving a smooth substantially undilated profile in the region of the join. It is then advantageous to provide some form of reinstatement or replacement sheathing to cover the exposed region of bare fibre to bring its diameter up to that of the sheathing of the fibre package. This sort of reinstatement sheathing allows the spliced fibre to be cabled without the need to make any specially enlarged chamber in the cabling to accommodate the splice.

The provision of reinstatement sheathing has been described in U.S. Pat. No. 4,131,404 assiigned to Les Cables de Lyons. In that specification the technique employed has required the use of a special micro-injection mould. The present invention is concerned with a more simple way of providing reinstatement sheathing in which the need for such an injection-mould is avoided.

According to the present invention there is provided a method of forming a flexible splice between the ends of a pair of thermoplastics sheathed glass optical fibres including the steps of stripping a length of sheathing from the end of each of the two optical fibres, of forming a fusion splice between the sheathing stripped ends of the two fibres by butt-welding them together, of positioning a quantity of thermoplastics material around the portion of fibre from which the sheathing has been stripped sufficient in volume to fill the space there around to a depth providing an overall diameter substantially equal to that of the fibre sheathing, of using a length of heat-shrinkable tubing positioned around said quantity of thermoplastics material to contain and mould that material while it is fused to form a reinstatement length of sheathing linking the unstripped regions of the original sheathing and having substantially the same diameter and flexibility as the stripped regions of sheathing it replaces, and of removing the length of heat-shrink tubing.

There follows a description of the provision of reinstatement sheathing around fusion splices by methods embodying the invention in preferred forms. The description refers to the accompanying drawings in which:

FIGS. 1, 2 and 3 are diagrammatic representations of successive stages in the manufacture of a splice and reinstatement sheathing according to a first method.

FIGS. 4 and 5 show successive stages according to a second method;

FIG. 6 shows a stage in the manufacture according to a third method;

FIG. 7 depicts the configuration of heater wire used for fusing the reinstatement sheathing;

FIG. 8 depicts the initial shape of reinstatement sheathing used for the method of FIGS. 4 and 5;

Figure 9:
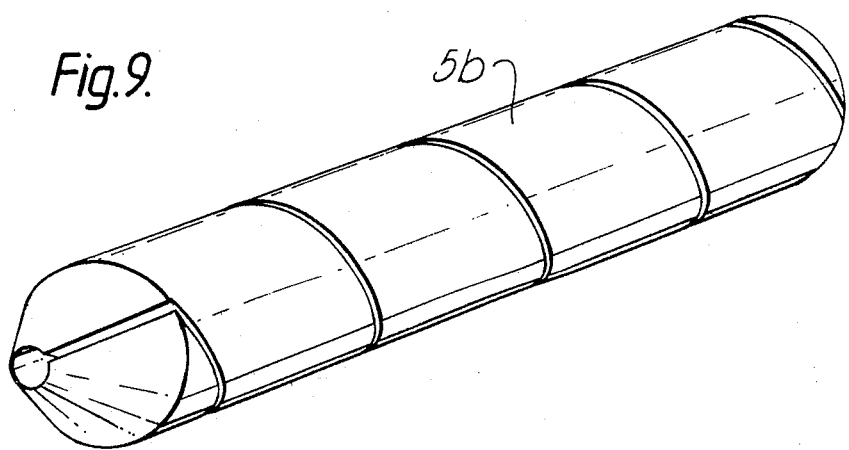
FIG. 9 depicts the initial shape of the reinstatement sheathing for the method of FIG. 6.

Referring particularly to FIG. 1, the ends of a pair of plastics sheathed silica optical fibres 1 and 2 are prepared for fusion splicing by removing a portion of the sheathing from each end to expose either bare, or primary plastics coated fibre 3. Typically the bare fibre diameter is about 125 microns, while the sheathing has an overall diameter of about 1 mm. The material of the sheathing may be a polyamide, such as that sold under the designation Nylon 11, or other suitable thermoplastic such as polypropylene or thermoplastic polyester elastomer such as that marketed by DuPont under the designation HYTREL. Enough of the sheathing is removed to enable a cleaved fibre end to be prepared, typically about 1 cm from the end of the sheathing. Generally there will be a primary plastics coating (not shown) intermediate the silica and the sheathing. This primary coating is provided on line with drawing the fibre and serves as a protective layer against surface damage by atmospheric attack. This is not wanted in the immediate vicinity of the fusion weld and so, if present, it is stripped from the fibre end, typically for a shorter distance to leave about 1 to 2 mm of uncoated fibre after cleaving.

Before the two prepared fibre ends are assembled and aligned for fusion welding, a length 4 of the translucent heat-shrink tubing and a length 5 of reinstatement sheathing are introduced over the end of one of the fibres, and advanced out of the way while the fusion weld is being made. Next the two fibre ends are aligned, butted together, and fused. At this stage it may be desired to reinstate the primary plastics coating by applying a drop of the required resin dissolved in a suitable solvent to the region of the weld. Alternatively a drop of heat curing silicone resin is applied to the fibre and cured. Then the reinstatement sheathing 5 is placed in position between the two cut ends of the original sheathing, and over this is placed the length 4 of heat-shrink tubing as shown in FIG. 2. Both lengths of the tubing are subjected to local heating by means of a resistance heating wire 6 shaped into the form of a keyhole configuration as depicted in FIG. 7. This is designed to provide a heating profile with substantially cylindrical symmetry about the fibre axis while retaining an open loop form that allows the wire 6 to be introduced around the splice, rather than having to thread the optical fibre through the heater as would be required if a closed loop form were used.

Instead of commencing heating at one end, it may be preferred, as depicted in FIG. 2, to commence the heating approximately in the middle of the reinstatement sheathing. The heating is just sufficient to cause the heat-shrink tubing 4 to collapse on to the reinstatement tubing 5, and cause it in its turn to fuse and collapse on to the bare (or primary coated) fibre 3.

In the case of polyamide (Nylon 11) reinstatement sheathing which melts at about 183° C. it is found that heat-shrink tubing made of a modified polyolefin, marketed by Raychem under the designation CRN and shrinking at about 135° C., proves satisfactory. The fibre 3 is then slowly traversed longitudinally with respect to the heater 6 so that the region of collapse is progressively extended to one end, taking care that the rate of collapse is slow enough for air to be driven out in front of the line of collapse rather than becoming entrapped and forming unwanted bubbles. Once the collapse has been extended to one end of the reinstatement sheathing, causing it to fuse to the original sheathing, the process is repeated, working in the opposite direction to bring about the fully collapsed condition depicted in FIG. 3. All that is then necessary to complete the process is to strip off the length 4 of that shrink tubing.

In general it may be found convenient to use the same plastics material for the reinstatement sheathing 6 as has been used for the original sheathing on the fibres. The reinstatement sheathing may be formed by extrusion of the plastics material round a suitably dimensioned wire. This wire has to be slightly larger in diameter than that of the original sheathing on the two fibres 1 and 2, and the diameter of the reinstatement sheathing must be chosen to provide substantially the same volume per unit length as is possessed by the original sheathing. In certain circumstances it may be preferred to use a higher modulus material for the reinstatement sheathing than for the original sheathing so that additional strength is provided in the immediate neighbourhood of the weld.

In the case of original sheathing having an external diameter of 1 mm it has been found that heat shrink tubing that will normally shrink to an internal diamter of 0.8 mm functions as an adequate mould for containing the fused material of the reinstatement sheathing. It is particularly advantageous to use transparent or translucent material for the heat shrink tubing so that the collapsing process can be continuously monitored visually, and appropriately controlled.

Referring now particularly to FIGS. 4, 5 and 8, a modification of the above described method involves the use of a different initial configuration of reinstatement sheathing 5a. This has the form of a length of longitudinally split tubing as depicted in FIG. 8. The split in the tubing means that it does not have to be slipped over the end of one of the fibres prior to welding, and hence it can be cut to length after welding. It is a drawback of the previously described method that the replacement sheathing can not readily be cut to length after it is engaged over one of the fibres, and hence it is necessary to know, before the weld is made, just how long the gap will be between the two lengths of original sheathing after the weld has been made. A feature of using this form of longitudinally split tubing is that it can be provided from the original sheathing taken from a short length of surplus sheathed fibre.

Once the weld has been made, the length of bare (or primary coated) fibre is introduced through the split in the replacement sheathing tube 5a. The collapsing and fusing process is then carried out as described previously, and as now illustrated in FIG. 5. As before, once the full collapse has been completed to produce a fusion splice as depicted in FIG. 3, the length 4 of heat-shrink tubing is stripped from the fusion splice to leave a fully sheathed length of spliced fibre with substantially no deviation from uniformity of profile over the entire length from before the position of one of the cut ends of the original sheathing to beyond the position of the other.

Figure 10:
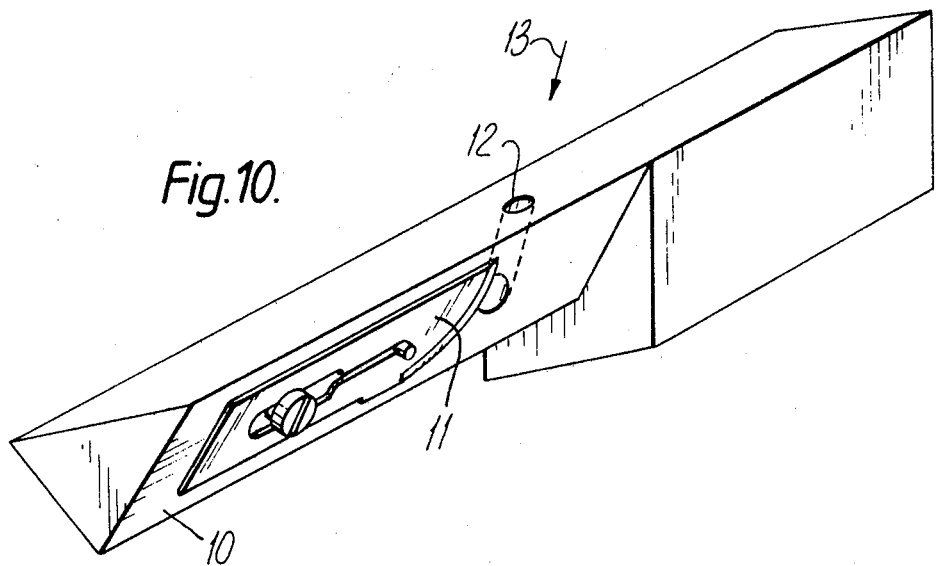
FIG. 10 depicts the tool for cutting the reinstatement sheathing of FIG. 9.
Figure 11:
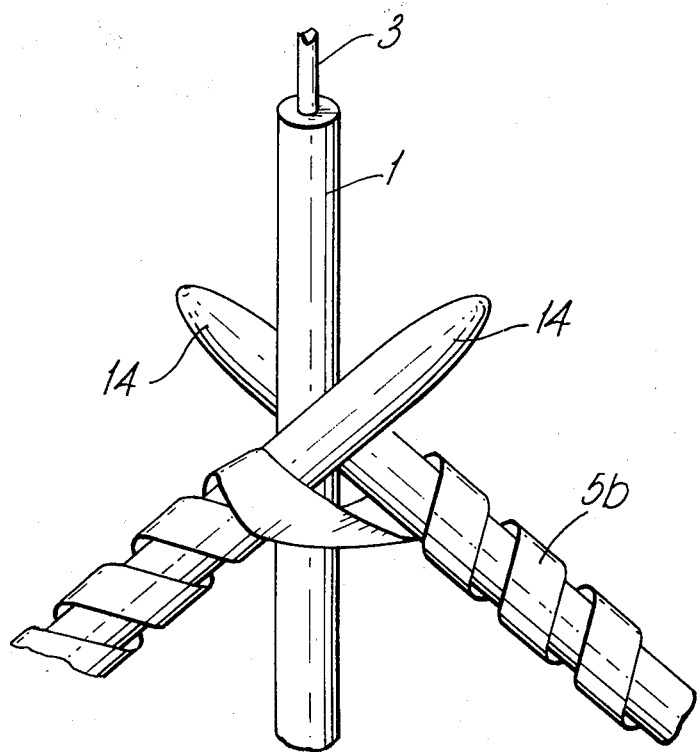
FIG. 11 depicts the stage in the fitting of the reinstatement sheathing of FIG. 9.

A further modification will now be described with particular reference to FIGS. 6, 9, and 10. This also uses a length of reinstatement sheathing that initially can conveniently have the same dimensions as the original sheathing. In this instance the reinstatement sheathing 5b, has before fusion, the form of a helix as depicted in FIG. 9. Such a helix can conveniently be cut using a hand-tool as depicted in FIG. 10. Essentially this tool consists of a metal block 10 to one face of which is clamped a scalpel blade 11. A small hole 12, just large enough freely to accommodate a length of sheathed fibre, is drilled through the block at an oblique angle. A short length of sheathing (not shown), stripped from a surplus piece of sheathed optical fibre, is introduced into the hole 12 in the direction of arrow 13, and, when its end comes up against the cutting edge of the scalpel blade 11, it is gently advanced while being rotated with the aid of a pin-chuck (not shown) gripping its other end. The orientation of the cutting edge of the scalpel blade 11 with respect to the axis of the hole 12 is preferably chosen so that the blade cuts obliquely through the sheathing in such a way that one edge of each turn of the helix beds down on top of the opposite edge of the adjacent turn. Typically the pitch of the helix may be between 10 and 20 turns per cm. After the helix has been prepared, it is cut to a length slightly greater than that of the gap it is to fill between the two lengths of original sheathing. Then its bore is expanded and it is engaged around the sheathing in a region close to the splice. This enlargement of the bore has the ancillary effect of shortening its length. One way of enlarging the bore is to force a pair of 1 mm diameter pins 14 (FIG. 11) into the opposite ends of the helix 5b till they meet in the middle. The axis of one pin is then inclined to that of the other so that a bend is produced near the mid point of the helix. The two pins are then advanced a little deeper into the helix so that their points emerge between two turns of the helix as depicted in FIG. 11. The pins are then used to wind the helix on to the original sheathing adjacent the splice.

Next the helix is positioned in the gap between the two ends of the original sheathing and heated to a temperature below its melting point in order to cause the helix to 'remember' its previous dimensions so that its diameter reduces and its length increases till its ends push up against the ends of original sheathing. This means that the degree of match between the length of the reinstatement sheathing prior to its fusion and the length of bare, or primary coated, fibre between the ends of the original sheathing is not so critical when using the helix method as when using the first two described methods.

FIG. 6 depicts the spliced fibres with the helix 5b fully wound on in position around the bare (or primary coated) fibre, and ready for the heat shrink tubing 4 to be slipped down the fibre to a position over it. For the purpose of illustration only, the helix is depicted in FIG. 6 as an open helix cut with straight sides, whereas in practice it will normally be preferred to use one with oblique cut sides and with the turns lying close together in order to minimise the amount of air needing to be expelled before the fusion of the reinstatement sheathing has been completed.

The collapsing and fusing process on the splice of FIG. 6 is carried out substantially as described previously with particular reference to FIG. 2. As before, once the full collapse has been completed to produce a fusion splice as depicted in FIG. 3, the length 4 of heat shrink tubing is stripped from the fusion splice to have a fully sheathed length of spliced fibre with substantially no deviation from uniformity of profile over the entire length from before the position of one of the cut ends to the original sheathing to beyond the position of the other.

What is claim is:

1. A method of forming a flexible splice between the ends of a pair of thermoplastic sheathed glass optical fibres comprising the steps of:
    stripping a length of sheathing from one end of each of the two optical fibres;
    forming a fusion splice between the sheathing stripped lengths of said fibres;
    positioning a quantity of thermoplastic material of the type used for the sheathing around the entire circumference of the sheathing-stripped lengths, the volume of the quantity of said thermoplastic material being substantially equal to the volume of sheathing stripped from said lengths;
    positioning a length of heat-shrinkable tubing around said quantity of thermoplastic material to contain and mold said material;
    fusing said thermoplastic material to the ends of the unstripped sheathing of the two fibres to form a replacement length of sheathing having a diameter substantially equal to the diameter of the unstripped sheathing; and
    removing said heat-shrinkable tubing.

2. A method as claimed in claim 1 wherein said quantity of thermoplastics material is positioned around the sheathing-stripped portion of fibre in the form of a tube whose internal diameter is large enough to slide over the original sheathing of the pair of fibres being fusion spliced.

3. A method as claimed in claim 1 wherein said quantity of thermoplastics material is positioned around the sheathing-stripped portion of fibre in the form of a longitudinally split tube whose external diameter is substantially equal to that of the original sheathing of the pair of fibres being fusion spliced.

4. A method as claimed in claim 1 wherein said quantity of thermoplastics material is positioned around the sheathing-stripped portion of fibre in the form of a helix.

5. A method as claimed in claim 4 wherein the helix is obliquely cut so that one edge of each turn beds down on top of the opposite edge of the adjacent turn.

6. A method as claimed in claim 4 wherein, prior to said positioning of the helix, the diameter of its bore is a loose fit on the sheathing-stripped portion of fibre, and its length is substantially equal to the length of the stripped portion of fibre.

7. A method as claimed in claim 2 wherein said quantity of thermoplastics material is taken from the sheathing of a length of optical fibre whose construction is identical with that of the pair of optical fibres being fusion spliced.

8. A method as claimed in claim 1 wherein said quantity of thermoplastics material has a higher modulus than that of the original sheathing of the fibres being fusion spliced.

9. A method as claimed in claim 1 wherein said pair of fibres has a primary plastics coating intermediate the glass and the sheathing which primary coating is also stripped from the ends of the two fibres before they are butt-welded together, and wherein, after the butt-welding and before said positioning of said quantity of thermoplastics material, a quantity of primary coating is applied in solution or as a heat curable resin to cover the bare glass.

* * * * *